US012715320B2

(12) United States Patent
Seong et al.

(10) Patent No.: US 12,715,320 B2
(45) Date of Patent: Aug. 25, 2026

(54) ACTIVE PAIRING METHOD AND DEVICE FOR WIRELESS LAN-BASED SMART CHARGING OR SMART CHARGING AND DISCHARGING

(71) Applicants: Hyundai Motor Company, Seoul (KR); Kia Corporation, Seoul (KR); Myongji University Industry and Academia Cooperation Foundation, Yongin (KR)

(72) Inventors: Jae Yong Seong, Hwaseong (KR); Min Ho Shin, Yongin (KR)

(73) Assignees: Hyundai Motor Company, Seoul (KR); Kia Corporation, Seoul (KR); Myongji University Industry and Academia Cooperation Foundation, Yongin (KR)

( * ) Notice: Subject to any disclaimer, the term of this patent is extended or adjusted under 35 U.S.C. 154(b) by 798 days.

(21) Appl. No.: 18/032,615

(22) PCT Filed: Oct. 21, 2021

(86) PCT No.: PCT/KR2021/014788

§ 371 (c)(1),
(2) Date: Apr. 19, 2023

(87) PCT Pub. No.: WO2022/086204

PCT Pub. Date: Apr. 28, 2022

(65) Prior Publication Data

US 2023/0382245 A1 Nov. 30, 2023

Related U.S. Application Data

(60) Provisional application No. 63/106,003, filed on Oct. 27, 2020, provisional application No. 63/094,462, filed on Oct. 21, 2020.

(30) Foreign Application Priority Data

Oct. 21, 2021 (KR) ........................ 10-2021-0140698

(51) Int. Cl.
*B60L 53/126* (2019.01)
*B60L 53/16* (2019.01)
(Continued)

(52) U.S. Cl.
CPC ............. *B60L 53/126* (2019.02); *B60L 53/16* (2019.02); *B60L 53/66* (2019.02); *H04W 12/50* (2021.01);
(Continued)

(58) Field of Classification Search
CPC ........ B06L 53/126; B06L 53/66; B06L 53/16; H04W 12/50; H04W 84/12; H02J 7/00; H02J 50/00
(Continued)

(56) References Cited

U.S. PATENT DOCUMENTS 5,157,319 A * 10/1992 Klontz .................... H01F 38/14 320/108
5,341,083 A * 8/1994 Klontz .................... H01F 38/14 320/109
(Continued)

FOREIGN PATENT DOCUMENTS

KR 10-2014-0116376 A 10/2014
KR 10-2019-0011187 A 2/2019
(Continued)

OTHER PUBLICATIONS

Yu, Taiwan Pateht Docment No. TW-500048-U, published May 1, 2015, 2 pages including 1 drawing. (Year: 2015).*
(Continued)

*Primary Examiner* — Phallaka Kik
(74) *Attorney, Agent, or Firm* — Fox Rothschild LLP

(57) ABSTRACT

Disclosed are an active earlier pairing method and device for wireless LAN-based smart charging or smart charging and discharging, wherein it is not necessary to restart a V2GTP communication session of an Electric Vehicle Communication Controller (EVCC). An active pairing method per-
(Continued)

formed by an electric vehicle (EV) comprises the steps of: transmitting, to a supply equipment communication controller (SECC) Discovery Protocol (SDP) server, an SDP request message including an EVID by which the EV can be identified; and receiving, from the SDP server communicating with SECCs, an SDP response message including information indicating a specific SECC that controls electric vehicle supply equipment (EVSE) in which the EV parks or into which the EV is plugged.

13 Claims, 9 Drawing Sheets

(51) Int. Cl.
*B60L 53/66* (2019.01)
*H02J 7/00* (2026.01)
*H02J 50/00* (2016.01)
*H04W 12/50* (2021.01)
*H04W 84/12* (2009.01)

(52) U.S. Cl.
CPC ............... *H04W 84/12* (2013.01); *H02J 7/00* (2013.01); *H02J 50/00* (2016.02)

(58) Field of Classification Search
USPC ......................................... 320/109, 108, 104
See application file for complete search history.

(56) References Cited

U.S. PATENT DOCUMENTS

| | | | | |
|---|---|---|---|---|
| 9,371,007 | B1 * | 6/2016 | Penilla | G06Q 30/0259 |
| 10,410,219 | B1 * | 9/2019 | El-Nakib | G06F 16/90332 |
| 2014/0375247 | A1 | 12/2014 | Chauhdary et al. | |
| 2017/0164179 | A1 * | 6/2017 | Jeon | H04W 40/244 |
| 2018/0111494 | A1 * | 4/2018 | Penilla | B60L 1/003 |
| 2019/0023140 | A1 | 1/2019 | Kim et al. | |
| 2020/0079237 | A1 | 3/2020 | Seong et al. | |
| 2020/0282859 | A1 | 9/2020 | Shin | |
| 2021/0323429 | A1 * | 10/2021 | Fata | H02J 7/35 |
| 2022/0069602 | A1 * | 3/2022 | Shin | H02J 7/47 |
| 2022/0126710 | A1 * | 4/2022 | Ward | B60L 53/35 |
| 2022/0274503 | A1 * | 9/2022 | Shin | B60L 53/66 |
| 2023/0365007 | A1 * | 11/2023 | Shin | B60L 53/66 |
| 2025/0145154 | A1 * | 5/2025 | Penilla | B60L 50/66 |

FOREIGN PATENT DOCUMENTS

| | | | | |
|---|---|---|---|---|
| KR | 20190011187 A * | 2/2019 | | H04W 4/44 |
| KR | 10-2020-0029986 A | 3/2020 | | |
| KR | 10-2020-0106826 A | 9/2020 | | |
| WO | WO-2013058614 A2 * | 4/2013 | | B60L 53/63 |

OTHER PUBLICATIONS

C.S. Kim et al., "A Study on Portable Smart Tester for Fault Diagnosis of Electric Vehicle Charger", Journal of the KIECS, 14(1), pp. 161-168 (Feb. 28, 2019). English Translation of Abstract only.

N. El Sayed, "A Prototypical Implementation of an ISO-15118-Based Wireless Vehicle to Grid Communication for Authentication over Decoupled Technologies", DAI Labor—Technische Universitaet Berlin, Berlin, Germany, 2019 AEIT International Conference of Electrical and Electronic Technologies for Automotive (AEIT Automotive) Turin (Italy), Jul. 2-4, 2019, ISBN: 978-8-8872-3743-6, 16 pages.

* cited by examiner

| Byte No. | Payload |
| --- | --- |
| 1 | Security |
| 2 | Transport Protocol |
| 3-12 | EVID |
| 13-22 | EVSEID |

ACTIVE PAIRING METHOD AND DEVICE FOR WIRELESS LAN-BASED SMART CHARGING OR SMART CHARGING AND DISCHARGING

CROSS-REFERENCE TO RELATED APPLICATIONS

The present application is a U.S. National Phase application under 35 U.S.C. § 371 of an International application No. PCT/KR2021/014788 filed on Oct. 21, 2021, which claims under 35 U.S.C. § 119 (e) the benefit of U.S. Provisional Application No. 63/094,462 filed on Oct. 21, 2020, U.S. Provisional Application No. 63/106,003 filed on Oct. 27, 2020 and Korean Patent Application No. 10-2021-0140698 filed on Oct. 21, 2021, the entire contents of which are incorporated by reference herein.

BACKGROUND

(a) Technical Field

The present disclosure relates to a pairing method for electric vehicle charging or electric vehicle charging/discharging, more particularly, to a method and an apparatus for proactive pairing for wireless LAN-based smart charging or charging/discharging without the need to restart a session.

(b) Description of the Related Art

In a smart charging or smart charging and discharging environment, a power line communication (PLC)-based pairing between an electric vehicle (EV) and a supply equipment communication controller (SECC) or electric vehicle supply equipment (EVSE) is performed automatically.

The smart charging is also referred to as 'grid to vehicle (V1G)', in which one-way charging from a power grid to an EV is performed through power distribution control. In addition, the smart charging/discharging is also referred to as 'vehicle to grid (V2G)', in which two-way charging/discharging is performed.

Meanwhile, in a wireless local area network (WLAN)-based smart charging or smart charging/discharging using wireless power transfer (WPT), automated connection device (ACD), slow charger (hereinafter referred to as 'alternating current (AC) charger') or fast charger (hereinafter referred to as 'direct current (DC) charger'), an EV should perform communications by forming a pair with an appropriate SECC for proper charging or discharging.

However, since wireless LAN communication has irregular characteristics and temporary or transient characteristics, it is not easy for the EV to connect to an appropriate SECC in the wireless LAN-based pairing, and even when connected, it is not easy for the EV to perform stable communications.

In addition, the wireless LAN-based SECC should know an EVSE connected to the EV or an EVSE of a spot where the EV is parked for appropriate control in charging or discharging the EV, and should be connected to the EVSE through the wireless LAN.

That is, in the wireless LAN-based EV charging or charging/discharging environment using wireless power transfer, automated connection device, slow charger, or fast charger, a role of the SECC is to communicate with the EV through a communication channel and to control the EVSE through communication channel.

In the conventional smart charging or charging/discharging, a reactive pairing scheme is used. For example, in the conventional reactive pairing scheme, pairing is confirmed by starting a session through a session setup for a conventional V2G communication session, and binding a signal between the EV and the EVSE and a signal between the EV and the SECC. If the pairing is confirmed immediately, it may be advantageous. In most cases, pairing fails at least once, and in those cases, pairing starts again according to a predetermined rule. Fine positioning using another form of pairing is likely to detect a false pairing, but will most likely react to the pairing as it is.

As described above, both a pairing between the SECC and the EV and a pairing between the SECC and the EVSE typically have frequent failures in the wireless LAN-based smart charging or smart charging/discharging environment. Accordingly, a reliable pairing method is required for wireless LAN-based smart charging or charging/discharging.

SUMMARY

In order to satisfy the demand from the above-described prior art, an objective of the present disclosure is to provide a method and an apparatus for proactive pairing in which an EV and an SECC are early paired in a wireless LAN-based smart charging or smart charging/discharging environment by using binding information of the EV and the EVSE before starting a session, whereby the session does not need to be restarted.

Another objective of the present disclosure is to provide a method and an apparatus for proactive pairing for wireless LAN-based smart charging or charging/discharging that facilitate proactive paring using an SECC discovery protocol (SDP), in which a session does not need to be restarted in a wireless LAN-based smart charging or smart charging/discharging environment.

A proactive pairing method for wireless LAN-based smart charging or charging/discharging, according to an aspect of the present disclosure for achieving the technical objective, may include, as a proactive pairing method for wireless LAN-based smart charging or charging/discharging performed by an electric vehicle (EV), transmitting a supply equipment communication controller (SECC) discovery protocol (SDP) request message to an SDP server, the SDP request message including a first EV identifier (EVID) capable of identifying a first EV, wherein a first electric vehicle supply equipment (EVSE) obtains the first EVID capable of identifying the first EV from the first EV parked in or plugged into the first EVSE, and provides the obtained first EVID to a first SECC; and receiving an SDP response message corresponding to the SDP request message from the SDP server communicating with the first SECC, wherein the SDP response message includes information indicating that an SECC corresponding to the first EVID is the first SECC.

The proactive pairing method may further include: after receiving the SDP response message, transmitting a session setup request message including the first EVID to the first SECC.

The proactive pairing method may further include: repeatedly transmitting the SDP request message in a multicast scheme at preset time intervals within a predetermined number of times, until the SDP response message including the information indicating that the SECC corresponding to the first EVID is the first SECC is received.

The SDP response message may be received when the information indicating that the SECC corresponding to the first EVID is the first SECC is shared through communication between the first SECC and the SDP server.

The proactive pairing method may further include: transmitting a transport layer security (TLS) request message to the first SECC in an SDP handshake and receiving a TLS response message from the first SECC.

A proactive pairing method for wireless LAN-based smart charging or charging/discharging, according to another aspect of the present disclosure for achieving the technical objective, may include, as a proactive pairing method for wireless LAN-based smart charging or charging/discharging performed by a first supply equipment communication controller (SECC), receiving a first electric vehicle (EV) identifier (EVID) from a first electric vehicle supply equipment (EVSE), the first EVID capable of identifying a first EV parked in a parking area for wireless power transfer of the first EVSE or connected with the first EVSE through a conductive cable; and communicating with an SECC discovery protocol (SDP) server in relation to an SDP request message transmitted from the first EV to the SDP server and including the first EVID, wherein the first SECC shares the SDP request message or information indicating that an SECC corresponding to the first EVID is itself with the SDP server, and the SDP server transmits an SDP response message including the information to the first EV.

The proactive pairing method may further include: receiving a session setup request message including the first EVID from the first EV.

The proactive pairing method may further include: before receiving the session setup request message, responding to a transport layer security (TLS) request from an EV communication controller (EVCC) of the EV using a TLS in an SDP handshake.

A proactive pairing method for wireless LAN-based smart charging or charging/discharging, according to yet another aspect of the present disclosure for achieving the technical objective, may include, as a proactive pairing method for wireless LAN-based smart charging or charging/discharging performed by an electric vehicle (EV), obtaining a first electric vehicle supply equipment (EVSE) identifier (EVSEID) capable of identifying a first EVSE from the first EVSE, wherein the first EVSE is an EVSE in which a first EV is parked or with which the first EV is connected through a conductive cable; transmitting, by an EV communication controller (EVCC) of the first EV, a supply equipment communication controller (SECC) discovery protocol (SDP) request message including the first EVSEID in a multicast scheme through a local link to which a plurality of SECCs are connected, in order to discover an SECC controlling the first EVSE; and receiving, from an SDP server communicating with a first SECC, an SDP response message including the SDP request message or information related to the first SECC, the information related to the first SECC indicating that a specific SECC corresponding to the EVSE ID is the first SECC itself.

The first EVID of the first EV may be stored by the first SECC and delivered from the first SECC to the first EVSE.

The SDP request message may further include a first EV identifier (EVID) of the first EV, and the first EVID may be a static identifier or a dynamic identifier that changes for each use.

A structure of the SDP request message may include parameters for security, transport protocol, EVID and EVSEID.

A proactive pairing method for wireless LAN-based smart charging or charging/discharging, according to yet another aspect of the present disclosure for achieving the technical objective, may include, as a proactive pairing method for wireless LAN-based smart charging or charging/discharging performed by an electric vehicle (EV), obtaining a first EV supply equipment identifier (EVSEID) capable of identifying a first EVSE from the first EVSE, wherein the first EVSE is an EVSE in which a first EV is parked or with which the first EV is connected through a conductive cable; and transmitting a session setup request message including the first EVSEID to a first supply equipment communication controller (SECC) corresponding to the first EVSEID.

In the obtaining, the first EV may detect a quick response (QR) code including an Internet protocol (IP) address and a port number of the first SECC from the first EVSE.

A proactive pairing method for wireless LAN-based smart charging or charging/discharging, according to yet another aspect of the present disclosure for achieving the technical objective, may include, as a proactive pairing method for wireless LAN-based smart charging or charging/discharging performed by an electric vehicle supply equipment (EVSE), detecting an EV identifier (EVID) of a first electric vehicle (EV) parked in or plugged into a first EVSE; and transmitting the EVID capable of identifying the first EV to a first supply equipment communication controller (SECC), wherein the first SECC provides the EVID to an SECC discovery protocol (SDP) server; the SDP server receives an SDP request message including the EVID from the first EV and transmits an SDP response message including an Internet protocol (IP) address of the first SECC to the first EV; and the first EV transmits a session setup message including the EVID to the first SECC that remembers the EVID and the first EVSE.

A proactive pairing method for wireless LAN-based smart charging or charging/discharging, according to yet another aspect of the present disclosure for achieving the technical objective, may include, as a proactive pairing method for wireless LAN-based smart charging or charging/discharging performed by an electric vehicle (EV) may include: detecting an electric vehicle supply equipment (EVSE) identifier (EVSEID) capable of identifying an EVSE; transmitting a supply equipment communication controller (SECC) discovery protocol (SDP) request message including the EVSEID and an EV identifier (EVID) capable of identifying the EV to an SDP server; and receiving an SDP response message including an Internet protocol (IP) address of an SECC from the SDP server, wherein the SDP server provides information on the EVID and the EVSEID to the SECC.

A proactive pairing apparatus for wireless LAN-based smart charging or charging/discharging, according to yet another aspect of the present disclosure for achieving the technical objective, may include a first electric vehicle supply equipment (EVSE) connected to a power grid and configured to supply power to a first electric vehicle (EV); a first supply equipment communication controller (SECC) controlling operations of the first EVSE and communicating with an EV communication controller (EVCC) of the first EV; and a SECC discovery protocol (SDP) server communicating with the first EV using an SDP, wherein the first EVSE obtains an EV identifier (EVID) capable of identifying the first EV from the first EV parked in or plugged into the first EVSE, and provides the obtained EVID to the first SECC; and the first EV transmits an SDP request message including the EVID to the SDP server, and receives, from the SDP server communicating with the first SECC, an SDP response message including the SDP request message or information indicating that an SECC corresponding to the EVID is the first SECC.

The first EV may transmit an SDP request message including an EVSE identifier (EVSEID) capable of identifying the first EVSE in a multicast scheme through a local link to discover the first SECC, and receive, from the SDP server communicating with the first SECC in the local link, an SDP response message including information on the first SECC matching the EVSEID.

The first EV may obtain the EVSEID from the first EVSE or a place where the first EVSE is installed.

The first EV may detect a quick response (QR) code including an Internet protocol (IP) address and a port number of the first SECC.

According to the present disclosure described above, provided are a method and an apparatus for proactive pairing without the need to restart a session, which can perform early pairing between an EV and an SECC using binding information of the EV and EVSE before starting the session in a wireless LAN-based smart charging or smart charging/discharging environment. Accordingly, a problem of connecting to a nearby EVSE due to errors in PLC occurring can be prevented when EVs and EVSEs attempt many-to-many (N:N) connections using the PLC during EV conductive charging.

In addition, according to the present disclosure, as a technique capable of performing pairing without removing a charger connector, provided is a proactive pairing method using an SDP without the need to restart a V2GTP (V2G transport protocol) communication session in the wireless LAN-based smart charging or smart charging/discharging environment. Accordingly, the pairing can be easily completed according to a response of only a matched SECC, and fast and reliable pairing can be made possible because repetitive SDP request messages are not required.

In addition, according to the present disclosure, by using SDP messages, the EV can discover an SDP client of the SECC using an EVSEID obtained from the EVSE. Accordingly, security can be improved because a dynamic EVID that is changed whenever it is used by the EV is delivered to the SECC.

In addition, according to the present disclosure, the EV can directly transmit a session setup request message to the SECC, which is a connection target, using the EVSEID including an IP address and a port number of the SECC, thereby performing the pairing procedure quickly and reliably.

In addition, according to the present disclosure, the EV can perform pairing with the SECC in a form of early pairing through the SDP server by receiving an SDP response message from the SDP server having received the EVID from the SECC, thereby performing reliable paring without the need to restart the session.

In addition, according to the present disclosure, the SDP response message including the EVID and EVSEID is transmitted to the SECC through the SDP server, whereby the EV can deliver the session setup request message including the EVID to the SECC to perform pairing conveniently and quickly.

DETAILED DESCRIPTION

Figure 1:
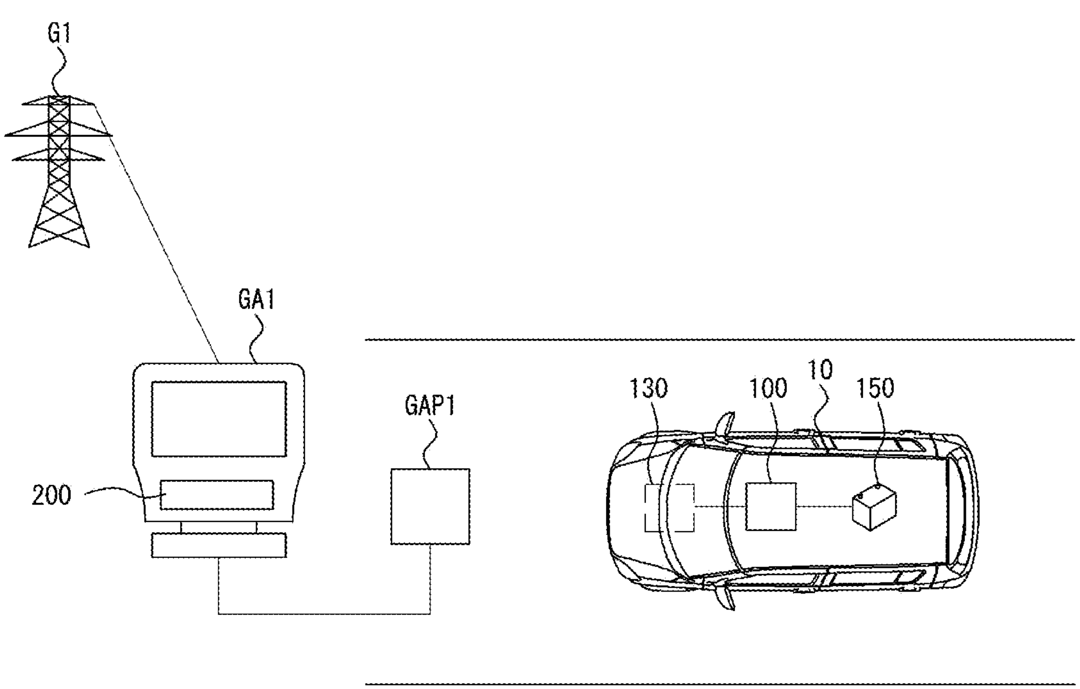
FIG. 1 is a conceptual diagram for describing a wireless power transfer structure of an electric vehicle (EV) to which a proactive pairing method for wireless LAN-based smart charging or charging/discharging according to an exemplary embodiment of the present disclosure (hereinafter simply referred to as 'proactive pairing method') is applicable.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Additional terms used in the present disclosure are defined as follows.

"Electric vehicle (EV)" may refer to an automobile defined in 49 code of federal regulations (CFR) 523.3 or the like. The EV may be used on highways and driven by electricity supplied from a vehicle-mounted energy storage device such as a battery rechargeable from a power source outside the vehicle. The power supply source may include a residence, a public electric service, or a generator using vehicle-mounted fuel. The EV may be referred to as an electric car, an electric automobile, an electric road vehicle (ERV), a plug-in vehicle (PV), a plug-in vehicle (xEV), or the like, the xEV may be referred to as or classified into a plug-in all-electric vehicle or battery electric vehicle (BEV), a plug-in electric vehicle (PEV), a hybrid electric vehicle (HEV), a hybrid plug-in electric vehicle (HPEV), a plug-in hybrid electric vehicle (PHEV), or the like.

"Plug-in Electric Vehicle (PEV)" may refer to an EV that recharges the on-vehicle primary battery by connecting to the power grid.

"Wireless power charging system (WC S)" may refer to a system for wireless power transfer, alignment, and communication between a ground assembly (GA) and a vehicle assembly (VA).

"Wireless power transfer (WPT)" may refer to a technology that transfers or receives electric power to and from an EV through non-contact means such as electromagnetic induction and resonance from a power source such as utility, grid, energy storage device, and fuel cell generator.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": Magnetic coupling between two coils. In the present disclosure, coupling between the GA Coil and the VA Coil.

"Original equipment manufacturer (OEM)": An EV manufacturer or a server operated by the EV manufacturer. It may include a root certification authority (CA) or a root certification server that issues an OEM root certificate.

"Power grid operator (V2G operator)": A primary actor participating in V2G communication using a transmission protocol, or an entity for initiation of a blockchain for automatic authentication of an EV or EV user and creation of a smart contract on the blockchain. It may include at least one trusted certification authority or trusted certification server.

"Charging service operator (or, mobility operator (MO))": One of entities within a PnC architecture that have a contractual relationship with an EV owner regarding charging, approval, and payment to enable an EV driver to charge an EV battery at a charging station. It may include at least one certification authority or certification server that issues and manages its own certificate. The charging service operator may be referred to as a mobility operator.

"Charge service provider (CSP)": An entity responsible for managing and authenticating a credential of an EV user, and performing a role of providing billing and other value-added services to customers. It may correspond to a special type of MO, and may be implemented in a combined form with MO.

"Charging station (CS)": A facility or device that has one or more EV supply equipment and actually performs charging of an EV.

"Charging station operator (CSO)": An entity that is connected to a power grid and manages power in order to supply power requested by an EV. It may be a term of the same concept as a charge point operator (CPO) or an e-mobility service provider (eMSP), or it may be a term of a concept included in the CPO or eMSP or including the CPO or eMSP. The CSO, CPO or eMSP may include at least one certification authority that issues or manages its own certificate.

"e-mobility authentication identifier (eMAID)": A unique identifier that links a contract certificate to a payment account of an owner of an electromobility that uses electricity. In exemplary embodiments, the mobility authentication identifier may include an identifier of an EV certificate or an identifier of a provisioning certificate. The term eMAID may be replaced to refer to 'e-mobility account identifier' or may be replaced with a contract ID.

"Clearing house (CH)": An entity that handles cooperation matters between MOs, CSPs, and CSOs. It can act as an intermediary that facilitates approval, billing, and adjustment procedures for EV charging service roaming between two parties.

"Roaming": Information exchanges and a scheme and provisions between CSPs, which allows EV users to access the charging services provided by multiple CSPs or CSOs pertaining to multiple e-mobility networks by using a single credential and contract.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Service session": A collection of services around a charge point related to the charging of an EV assigned to a specific customer in a specific timeframe with a unique identifier.

Hereinafter, exemplary embodiments of the present disclosure will be explained in detail by referring to accompanying figures.

A proactive pairing method or early pairing method between an EVCC and an SECC according to the present exemplary embodiments provide a fast and reliable pairing procedure that does not require restarting a session in a wireless LAN-based smart charging or smart charging/discharging environment.

FIG. 1 is a conceptual diagram for describing a wireless power transfer structure of an EV to which a proactive pairing method for wireless LAN-based smart charging or charging/discharging according to an exemplary embodiment of the present disclosure (hereinafter simply referred to as 'proactive pairing method') is applicable.

As shown in FIG. 1, wireless power transfer (WPT) for an electric vehicle (hereinafter, 'EV') 10 may be defined as a process of transferring an electrical energy of a power grid G1 from a supplier-side device to a consumer-side device through a magnetic field in a state of magnetic induction or magnetic resonance without current flow through a galvanic connection. That is, the wireless power transfer may be used to charge a battery 150 of the EV 10 by transferring power from a charging station GA1 to the EV 10.

The EV 10 may include a reception pad 130 having a reception coil for wirelessly receiving an electromagnetic energy from a transmission pad GAP1 of the charging station GA1. The reception coil of the reception pad 130 receives a magnetic energy from a transmission coil of the transmission pad GAP1 of the charging station GA1 by electromagnetic induction or magnetic resonance. The magnetic energy received by the EV 10 is converted into an induced current, and the induced current is rectified into a DC current and then used to charge the battery 150.

The charging station GA1 may receive power from the commercial power grid G1 or a power backbone and supply energy to the EV 10 through the transmission pad GAP1. An EVSE corresponding to at least part of the charging station GA1 may be located in various places such as a garage or parking lot belonging to the home of the owner of the EV a parking area for EV charging at a gas station, or a parking area at a shopping center or office building.

The charging station GA1 may communicate with a power infrastructure management system or infrastructure server that manages the power grid G1 through wired/wireless communication. In addition, the charging station GA1 may perform wireless communication with the EV 10.

The wireless communication may include wireless LAN (WLAN)-based communication based on Wi-Fi according to the IEEE 802.11 protocol, and may also include peer-to-peer signaling (P2PS) communication using a low frequency (LF) magnetic field signal and/or a low power excitation (LPE) signal. The wireless communication between the charging station GA1 and the EV 10 may include one or more of various communication schemes such as Bluetooth, Zigbee, and cellular as well as the above-described communication schemes.

In addition, the EV 10 and the charging station GA1 may perform a charging process by exchanging messages according to an extensible markup language (XML) or an efficient XML interchange (EXI) based data expression format. That is, communication for the charging process may be performed between an EVCC 100 and an SECC 200 through a wireless LAN or the like. However, in order to prevent a pairing failure due to wireless LAN characteristics in the wireless LAN-based pairing, proactive pairing or early pairing using an SECC discovery protocol (SDP) may be performed in the present exemplary embodiments.

In addition, during a communication process for the charging process, the EV may first verify an identity of the charging station to identify whether it is a trusted facility, and establish a secure channel with the charging station to protect communication from unauthorized access. The secure channel may be established by a transport layer security (TLS). A TLS session may be performed according to a TLS session establishment procedure after an Internet protocol (IP)-based communication connection establishment procedure.

Figure 2:
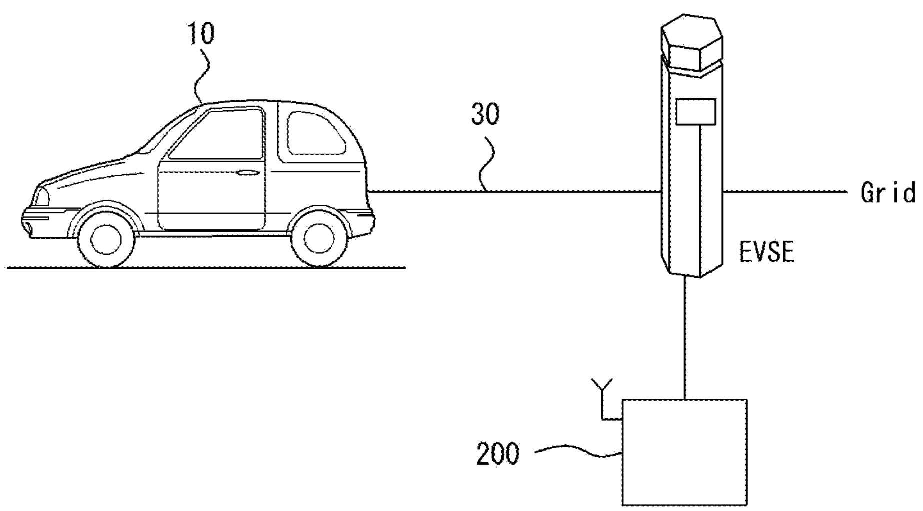
FIG. 2 is a conceptual diagram for describing a conductive charging structure of an EV to which a proactive paring method according to an exemplary embodiment of the present disclosure is applicable.

FIG. 2 is a conceptual diagram for describing a conductive charging structure of an EV to which a proactive paring method according to an exemplary embodiment of the present disclosure is applicable.

As shown in FIG. 2, EV conductive charging may be performed by connecting the EV 10 to an EVSE of the charging station through an automatic connection device or a charging cable 30, and performing session setup and pairing between the EVCC of the EV and the SECC 200 that controls the EVSE.

The EV 10 may have a vehicle inlet connectable to a vehicle connector of the charging cable 30. The vehicle inlet provided in the EV 10 may support slow charging, fast charging, or both slow charging and fast charging.

In addition, the EV 10 may include an on-board charger to support slow charging or charging through AC power supplied from a general power system. During slow charging, the on-board charger boosts the AC power supplied by wire from the outside, converts it into DC power, and supplies it to a battery built in the EV 10. On the other hand, when DC power for fast charging is supplied to the vehicle inlet, the DC power may be supplied and charged to the battery without passing through the on-board charger.

The charging cable 30 may include a vehicle connector and a plug in its both ends, and may be used for the EVCC of the EV 10 and the SECC 200 to communicate with each other in a power line communication (PLC) scheme. The vehicle connector is a connection part that can be electrically connected to the EV 10, and the plug may be connected to a socket-outlet connected to the charging station or the power grid. The socket-outlet refers to a wall jack, etc. installed in a charging facility such as a garage or parking lot belonging to the home of the owner of the EV 10, a parking area allocated for EV charging at a gas station, or a parking area at a shopping center or workplace, as well as a commercial charging station facility.

Meanwhile, for smart charging or smart charging/discharging of the EV 10, the EVCC and the SECC 200 may perform wireless LAN-based communication. In this case, a pairing failure due to wireless LAN characteristics may occur at every pairing, and to prevent this, proactive pairing or early pairing using the SDP may be performed in the present exemplary embodiments.

Figure 3:
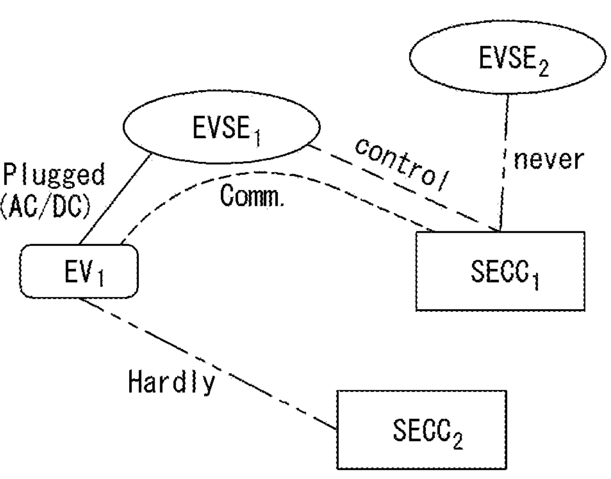
FIG. 3 is a schematic diagram for describing a pairing procedure in a power line communication (PLC)-based smart charging/discharging environment of a comparative example.
Figure 4:
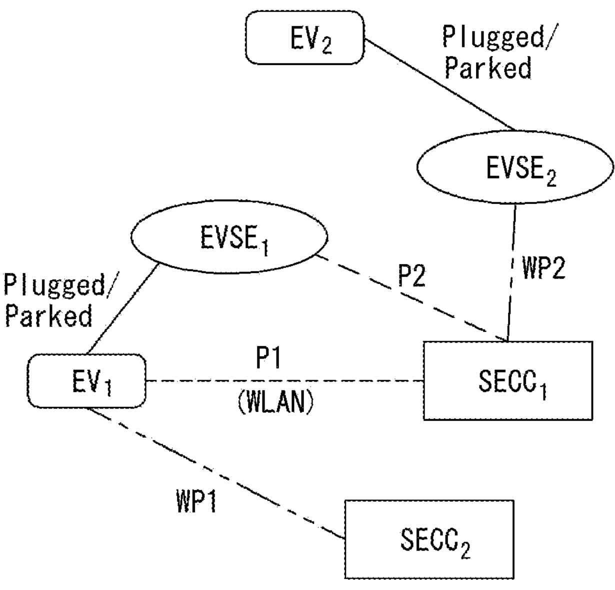
FIG. 4 is a schematic diagram for describing a pairing procedure in a wireless local area network (WLAN)-based smart charging/discharging environment of another comparative example.

FIG. 3 is a schematic diagram for describing a pairing procedure in a power line communication (PLC)-based smart charging/discharging environment of a comparative example. FIG. 4 is a schematic diagram for describing a pairing procedure in a wireless local area network (WLAN)-based smart charging/discharging environment of another comparative example.

As shown in FIG. 3, in the smart charging or charging/discharging of the comparative example, a first EV EV1 may be plugged into a first EVSE EVSE1 and communicate with a first SECC SECC1 in a PLC scheme to perform AC charging or DC charging. The first SECC controls the first EVSE.

Here, it is difficult for the first EV to be connected to a second SECC SECC2 while being connected to the first EVSE. In addition, the first SECC may never be connected to a second EVSE EVSE2 that is not a control target.

As described above, pairing between the EVCC and the SECC or EVSE, which use the PLC, may be automatically performed.

As shown in FIG. 4, in the smart charging or charging/discharging of another comparative example, the first EV EV1 may be plugged into the first EVSE EVSE1 for AC charging or DC charging, or may be parked in a parking area where a primary pad or a transmission pad of the first EVSE is installed for wireless power transfer, and may be paired with the first SECC SECC1 through a wireless LAN (P1). The first SECC may be also paired with the first EVSE through a wireless LAN (P2).

On the other hand, in a pairing process through the wireless LAN, the first EV may be connected to the second SECC SECC2 through incorrect pairing (WP1). In this case, normal pairing between the first EV and the first SECC may fail.

In addition, in a pairing process through the wireless LAN, the first SECC may be connected to the second EVSE EVSE2 through incorrect pairing (WP2). The second EVSE refers to an EVSE different from the first EVSE, into which a second EV EV2 is plugged or in which the second EV is parked in a specific parking area. In this case, normal pairing between the first SECC and the second EVSE may fail.

As described above, pairing between the EV and the SECC and pairing between the SECC and the EVSE for wireless LAN-based communication in smart charging or charging/discharging easily or frequently fail due to irregular characteristics and temporary or transient characteristics of the wireless LAN.

Meanwhile, the proactive pairing method according to the present exemplary embodiments can solve the problem in the wireless LAN-based pairing of the comparative example described above. That is, the proactive pairing method performs early pairing before starting session setup between the EV and the SECC. The session setup may include a procedure for starting to establish a session according to the existing procedure, for example, a session defined in the ISO 15118. That is, the proactive pairing method does not need to restart a session for EV charging or charging/discharging process by using the SDP. The use of SDP may include communication between SDP clients or may include communication through an SDP server. In addition, the proactive pairing method can be easily implemented by using EV-EVSE binding information generated between the EV and the EVSE.

The proactive pairing method will be described in more detail with reference to the drawings.

Figure 5:
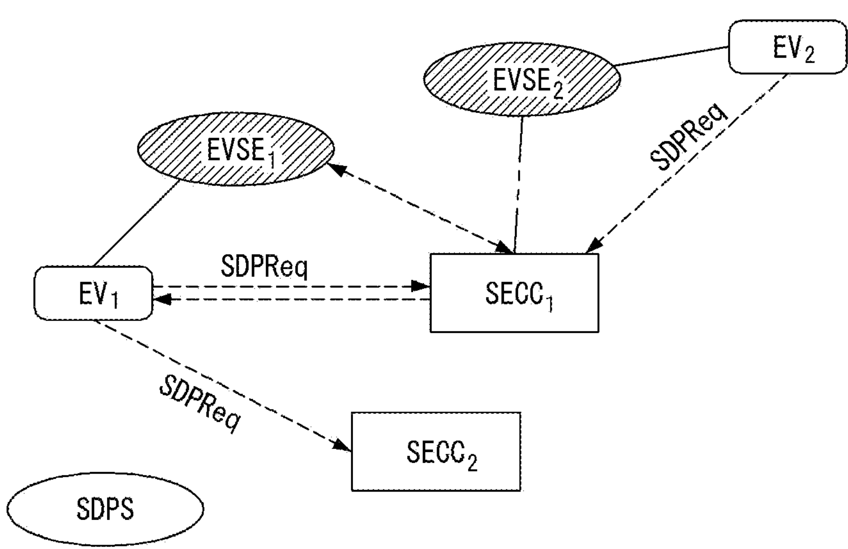
FIG. 5 is a schematic diagram for describing a proactive pairing method according to a first exemplary embodiment of the present disclosure.

FIG. 5 is a schematic diagram for describing a proactive pairing method according to a first exemplary embodiment of the present disclosure.

As shown in FIG. 5, a proactive pairing method may be performed centering on the EVSE. The first EVSE EVSE1 may detect the first EV EV1 parked in a parking area of the first EVSE or plugged into the first EVSE. Similarly, the second EVSE EVSE2 may detect the second EV EV2 parked in a parking area of the second EVSE or plugged into the second EVSE.

The first EVSE may detect a first EV identifier (EVID) of the first EV through camera image recognition or PLC. In the present exemplary embodiment, the first EVID may be a general-purpose unique identifier capable of identifying the first EV, and may be a static identifier that is difficult to change because corresponding information is shared by a plurality of entities.

The acquisition of the EVID through camera image recognition may include extracting a pre-stored EVID corresponding to a vehicle number of the first EV. The acquisition of the EVID from the plug-connected first EV through PLC may be performed according to a preconfigured rule before session setup starts. In addition to the above method, the first EVSE may acquire the EVID of the first EV through a method such as user access through a wireless LAN. These EVID acquisition methods may be equally or selectively applied to the second EVSE.

Then, the first EVSE may deliver the first EVID to the first SECC. In the present exemplary embodiment, it is assumed that the first SECC controls the first EVSE but does not control the second EVSE, and the second EVSE is controlled by the second SECC.

Then, the first EV may transmit a pairing message including the first EVID to an SDP server (SDPS) based on the SDP. The SDP server may exchange information with at least one SECC or may communicate according to a preconfigured rule, policy, or procedure. The SDP server may be implemented in the same physical device as the SECC and may interface to the same IP address.

The pairing message transmitted from the first EV EV1 to the SDP server SDPS may be referred to as an SDP-based request message (hereinafter, referred to as 'SDP request message' or SDPReq').

Here, a payload length of the SDP request message may be 2 bytes, but is not limited thereto. Each EV's SDP client may communicate with the SDP server. In transmitting the SDP request message, the first EV may transmit payloads having a predefined payload type (e.g., SDPRequestPayloadID) to a multicast address of a destination local link in a predetermined byte order.

In addition, the SDP request message of the first EV may be delivered to the first SECC before the first EVID arrives at the first SECC. Accordingly, the EV may repeatedly transmit the SDP request message until it finds a matching SECC. The repeated transmission of the SDP request message may be performed at intervals of at least 250 ms, and if a SDP response message is not normally received until it is performed continuously up to 50 times, the repeated transmission of the SDP request message may be stopped.

In this case, based on information on the first SECC having the first EVID or information matching the first EVID among several SECCs, the SDP server may transmit an SDP response message to the first EV. That is, the SDP server may transmit, to the first EV, an SDP response message including information indicating that the SECC corresponding to the first EVID is the first SECC in response to the SDP request message of the first EV. This may correspond to a case where the first SECC transmits the SDP response message including information indicating that the SECC corresponding to the first EVID is itself to the first EV through the SDP server. This case may be implemented according to an association relationship between the first SECC and the SDP server.

On the other hand, since the second SECC does not have the first EVID or information corresponding thereto in relation to the SDP request message of the first EV, it does not or cannot transmit an SDP response message to the first EV through interworking with the SDP server.

In addition, the SDP server SDPS communicating with the first SECC may receive the SDP request (SDPReq) message from the second EV, but cannot receive the first EVID from the second EVSE, which is not a control target of the first SECC. Accordingly, the SDP server cannot process a preconfigured normal response to the second EV's SDP request message.

Then, the first EV may transmit a session setup request (SessionSetupReq) message including the first EVID to the first SECC. Since the first SECC knows the first EV and the first EVSE corresponding to or assigned to the first EVID through the above-described process, the first SECC can respond normally to the session setup request message of the first EV, and start a communication session for charging or charging/discharging process of the first EV.

According to the present exemplary embodiment, by using SDP communication between SDP clients of the EV communicating with a single SDP server around the EVSE, early pairing or proactive pairing can be conveniently performed before the session setup starts. Here, the SDP server may respond with the SDP response message only after receiving the SDP request message of the SDP client of each V2G entity.

Figure 6:
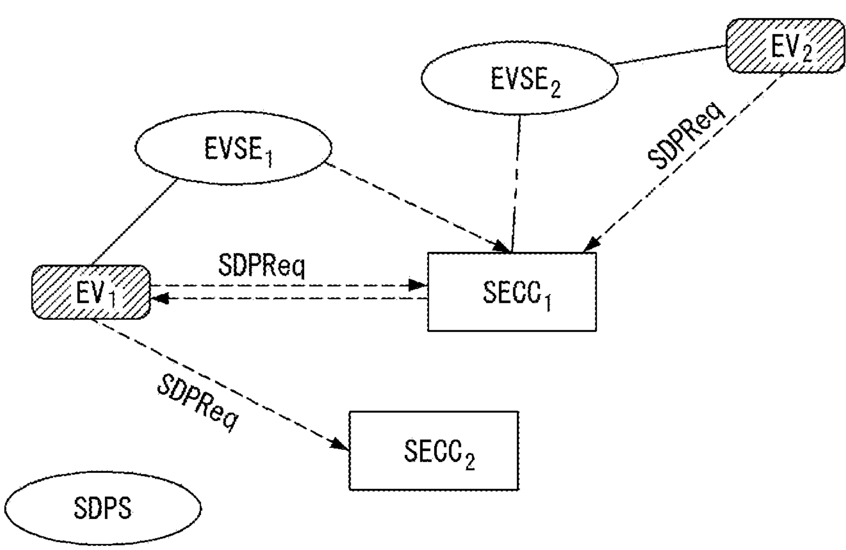
FIG. 6 is a schematic diagram for describing a proactive pairing method according to a second exemplary embodiment of the present disclosure.

FIG. 6 is a schematic diagram for describing a proactive pairing method according to a second exemplary embodiment of the present disclosure.

As shown in FIG. 6, a proactive pairing method may be performed centering on the EV. The first EV EV1 may be parked in a parking area of the first EVSE EVSE1 or plugged into the first EVSE, wherein the first EV may detect the first EVSEID of the first EVSE. It is assumed that the first EVSE is controlled by the first SECC SECC1, but not by the second SECC SECC2.

Similarly, the second EV (EV2) may be parked in a parking area of the second EVSE EVSE2 or plugged into the second EVSE, wherein the second EV may detect the second EVSEID of the second EVSE. It is assumed that the second EVSE is controlled by the second SECC SECC2, but not by the first SECC SECC1.

The aforementioned first or second EVSEID may be a site-unique identifier for the corresponding EVSE.

When the EV is parked in the parking area of the EVSE or plugged into the EVSE, a camera mounted on the EV may photograph an EVSEID mark installed or exposed on the EVSE, a controller of the EV connected to the camera may recognize the photographed EVSEID to retrieve the EVSEID, and the EVCC may obtained the EVSEID. Of course, the acquisition of the EVSEID may be performed by receiving the EVSEID through PLC from the EVSE into which the EV is plugged. In addition to the above methods, the EV may obtain the EVSEID through a method such as user access through a wireless LAN.

Then, the first EV may transmit an SDP request message including the first EVSEID to the first SECC, strictly speaking, to the SDP server SDPS that exchanges information with the first SECC. Here, the first EV may transmit the SDP request message including the first EVSEID to a plurality of SECCs including the first SECC.

In this case, the SDP server SDPS may communicate with an SDP client of the first EV, and transmit an SDP response message to the first EV based on information exchanged with the first SECC having the first EVSEID or information matching the first EVSEID. That is, the first SECC may transmit, to the first EV and through the SDP server, the SDP response message including information indicating that the SECC corresponding to the first EVSEID is itself in response to the SDP request message of the first EV.

Here, the first SECC may know an IP address of the first EV through the SDP server. The SDP response message may include information required for the first EV and the first SECC to perform proactive paring therebetween.

Since the second SECC does not have the first EVID or information corresponding thereto in relation to the SDP request message of the first EV, the second SECC may not perform any action or response in relation to the SDP request message.

In addition, the SDP server communicating with the first SECC may receive an SDP request (SDPReq) message from the second EV, but may not receive or store the first EVID from the second EVSE that is not a control target of the first SECC. Even when the first EVSEID is received from the first EV, since the first EVSEID corresponds to irrelevant information, the SDP server may not perform any action or response to the SDP request message of the second EV.

Then, the first EV may transmit a session setup request (SessionSetupReq) message including the first EVID to the first SECC. Since the first SECC knows the first EV and the first EVSE through the above-described process and can temporarily store the corresponding information, the first SECC may normally respond to the session setup request message of the first EV, and start a communication session for the charging or charging/discharging process of the first EV in a state in which early paring has been completed.

According to the present exemplary embodiment, by using SDP communication between SDP clients of the EV communicating with a single SDP server around the EV, early pairing or proactive pairing can be conveniently performed before the session setup starts. Here, the single SDP server does not need to communicate with SECCs with substantially static identifiers, and the EV does not need to repeatedly transmit the SDP request message.

In addition, as a modified example of the proactive pairing method of the present exemplary embodiment, as shown in FIG. 6, when the first EV transmits the SDP request (SDPReq) message to the first SECC through the SDP server, the first EV may be implemented to transmit the SDP request (SDPReq) message by including the first EVID and the first EVSEID. In this case, the first EVID may be unique to the SECC as a dynamic identifier that can be changed every time. In addition, the SDP server communicating with the first SECC may transmit, to the first EV, an SDP response message including the first EVID and/or information indicating that the SECC corresponding to the first EVSEID is the first SECC.

According to the present exemplary embodiment, the SECC may omit cross communication through an application layer by delivering the EVID received from the EV to the EVSE.

Figures 7, 8:
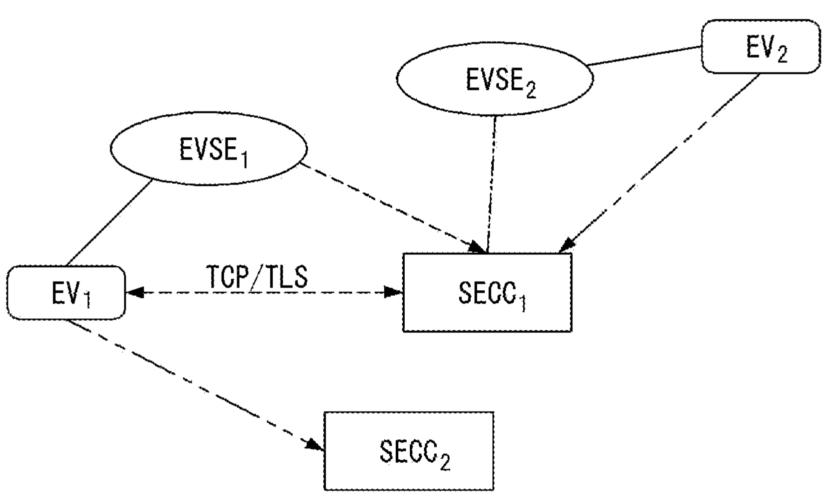
FIG. 7 is a schematic diagram for describing a proactive pairing method according to a third exemplary embodiment of the present disclosure.
FIG. 8 is a diagram for describing an SDP request message payload applicable to a proactive pairing method according to an exemplary embodiment of the present disclosure.

FIG. 7 is a schematic diagram for describing a proactive pairing method according to a third exemplary embodiment of the present disclosure.

As shown in FIG. 7, a proactive pairing method may be performed centering on the EV. That is, the first EV EV1 may be parked in a parking area of the first EVSE EVSE1 or plugged into the first EVSE. In addition, the first EV may detect the first EVSEID of the first EVSE. Here, the first EVSEID may include an IP address of the first SECC SECC1 or may include the IP address and a port number of the first SECC SECC1. Based on the information, the first EV may perform SDP-based communication with the SDP server and perform early pairing.

Here, the first EV may detect the first EVSEID through a QR code installed in the first EVSE or located in a place where the first EVSE is installed, but is not limited thereto.

Then, the first EV may transmit a session setup request message including the first EVID to the first SECC SECC1. The first SECC may start an EVCC V2G communication session with the first EV by identifying the first EVID and responding to the session setup request message. In this case, the EVCC V2G communication session of the first EV including session setup may be performed in a state where a transmission control protocol (TCP)/transport layer security (TLS) connection is established. In the communication session, all communication after an SDP handshake may use the TLS and TCP. In this case, a parameter 'security' may be set to TLS, and a parameter 'transport protocol' may be set to TCP.

Meanwhile, since the second SECC SECC2 uses a different IP address or different port number than those of the first SECC, a communication session cannot be established with the first EV associated with the first EVSE. In addition, the second EV EV2 parked in a parking area of the second EVSE EVSE2 or plugged into the second EVSE may attempt to establish a TCP/TLS connection with the first SECC or transmit a session setup request message to the first SECC. In this case, since the IP address or port number included in the corresponding message belongs to the second EV, which is not currently a proactive pairing target, the first SECC may process it with a response message including failure or failure information to the connection establishment or request message of the second EV.

According to the present exemplary embodiment, it is possible to establish security of the communication session when early pairing is performed through the SDP server. In addition, when supporting a static map, the SECC has an advantage of not needing to store its own state or connection state. In addition, in the V2G communication state in terms of the EVCC, there is an advantage in that the procedure can be simplified because the EV or EVSE does not need to allocate its own identifier (EVID/EVSEID) or corresponding IP address before SECC discovery.

Here, from the perspective of the EVCC, the general communication state of V2G communication may transition in the order of IP address assignment, SECC discovery, TCP/TLS connection establishment, EVCC V2G communication session, and TCP/TLS connection termination, and the corresponding communication session may be terminated when the IP address assignment, SECC discovery, or TCP/TLS connection establishment is not properly completed.

FIG. 8 is a diagram for describing an SDP request message payload applicable to a proactive pairing method according to an exemplary embodiment of the present disclosure.

As shown in FIG. 8, an SDP request message payload may have a length of 2 bytes, but is not limited thereto, and may have a predetermined length, for example, 22 bytes to be effectively used in the proactive pairing method of the present exemplary embodiment.

In the above-described case, the first byte may be allocated for setting a parameter 'security', the second byte may be allocated for setting a parameter 'transport protocol', the third to twelfth bytes may be allocated for setting a parameter 'EVID', and the thirteenth to twenty-second bytes may be allocated for setting a parameter 'EVSEID'.

The EVID may be unique for each site or EV. Further, the EVSEID may be unique for each site and may include the IP address and port number of the SECC.

Meanwhile, the SDP client of the EV may transmit an SECC discovery request message or an SDP request message having the above-described payload to the SDP server. In this case, the SDP client may transmit the payload in the order of byte numbers. For example, the SDP client may transmit the payload in descending order of byte numbers from the first byte to the twenty-second byte.

The payload of the SDP response message may be configured to include a 16-byte IP address parameter, a 2-byte port number parameter, a 1-byte security parameter, and a 1-byte transport protocol parameter.

Figure 9:
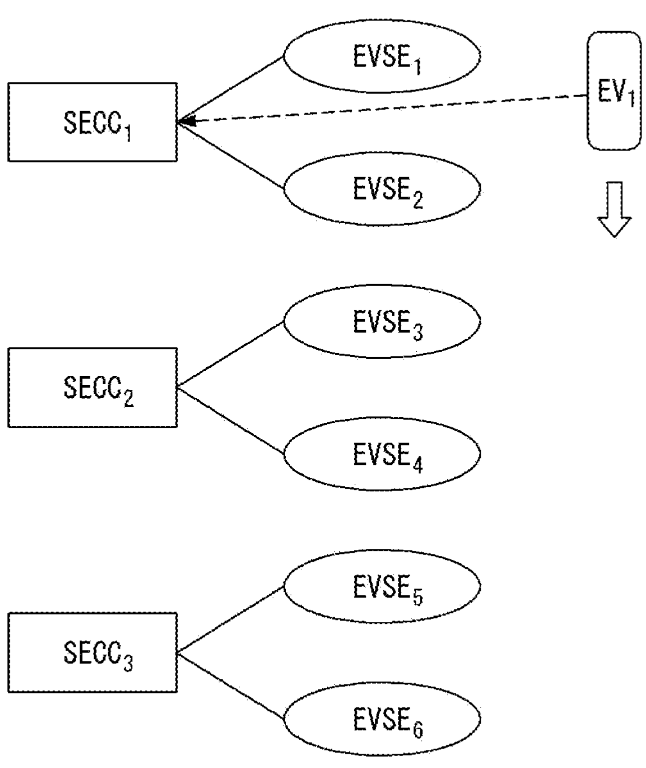
FIG. 9 is a schematic diagram for describing a partial configuration of an automated connection device (ACD)-based charging infrastructure capable of employing the proactive pairing method of the present exemplary embodiment.

FIG. 9 is a schematic diagram for describing a partial configuration of an automated connection device (ACD)-based charging infrastructure capable of employing the proactive pairing method of the present exemplary embodiment.

As shown in FIG. 9, pairing may be attempted before the first EV EV1 is parked or connected to a plug. However, if there is no binding between the first EV and a specific EVSE, the purpose of pairing becomes unclear and ambiguous. Of course, a case of reserved EVSE may be excluded.

In particular, if the first EV continues to move after the first SECC SECC1 recognizes the first EV connected through an ACD, ACD-based initial pairing between the first SECC and the first EV may fail.

For the above case, the proactive pairing method of the present exemplary embodiment may be usefully applied. That is, when the first EV is connected to a specific EVSE through the ACD, pairing between the first EV and the specific SECC may be performed early using the SDP. In addition, by using binding information between the EV and the EVSE, that is, binding information recognized by the EVSE or EV, pairing for a communication session may be performed early and proactively before starting the SECC V2G communication session. In the case of the above-described early pairing or proactive pairing, there is an advantage in that a session does not need to be restarted even when an error occurs.

Figure 10:
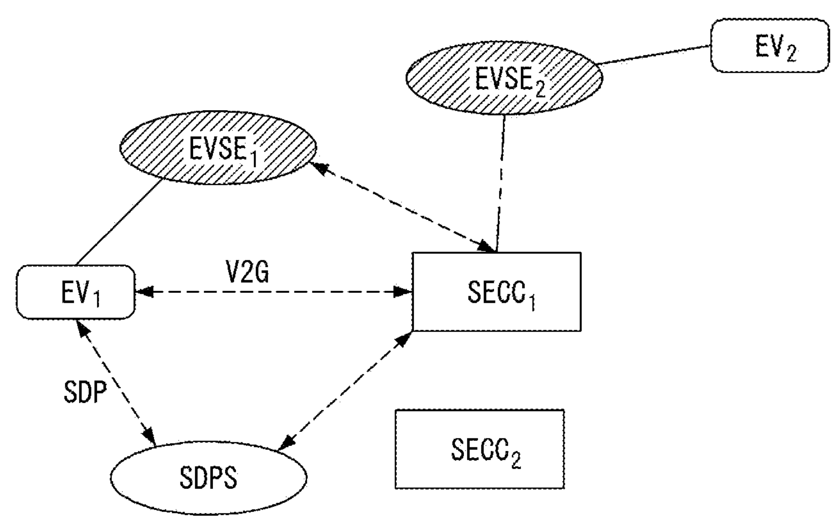
FIG. 10 is a schematic diagram for describing a proactive pairing method according to a fourth exemplary embodiment of the present disclosure.

FIG. 10 is a schematic diagram for describing a proactive pairing method according to a fourth exemplary embodiment of the present disclosure.

As shown in FIG. 10, a proactive pairing method may be performed centering on the EVSE. The first EVSE EVSE1 may detect the first EV EV1 parked in a parking area of the first EVSE or plugged into the first EVSE. Similarly, the second EVSE EVSE2 may detect the second EV EV2 parked in a parking area of the second EVSE or plugged into the second EVSE.

The first EVSE may obtain the first EVID of the first EV through camera image recognition or power line communication. In the present exemplary embodiment, the first EVID may be a general-purpose unique identifier capable of identifying the first EV, and may be a static identifier that is difficult to change because corresponding information is shared by a plurality of V2G entities.

Then, the first EVSE may deliver the first EVID to the SDP server SDPS through the first SECC SECC1. In addition, the first EV may transmit an SDP request message including the first EVID to the SDP server SDPS.

Then, the SDP server SDPS communicating with a plurality of SECCs (SECC1 and SECC2) may transmit an SDP response message including the IP address of the first SECC to the first EV. In this case, the first SECC knows the first EVID and the first EVSE through the above process. The SDP response message may include a protocol or information on SDP processing during a message exchange loop or charging loop.

Then, the first EV may transmit a session setup request message including the first EVID to the first SECC. The first SECC is aware of the first EVSE and controls the first EVSE according to the session setup request message or the like.

According to the present exemplary embodiment, early pairing may be actively and effectively performed by using the SDP server before initiating an EVCC V2G session.

Figure 11:
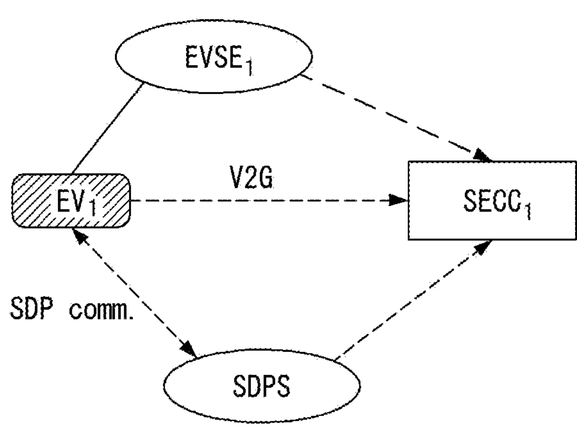
FIG. 11 is a schematic diagram for describing a proactive pairing method according to a fifth exemplary embodiment of the present disclosure.

FIG. 11 is a schematic diagram for describing a proactive pairing method according to a fifth exemplary embodiment of the present disclosure.

As shown in FIG. 11, a proactive pairing method may be performed centering on the EV. That is, the first EV EV1 may be parked in a parking area of the first EVSE EVSE1 or plugged into to the first EVSE, and may obtain the first EVSEID capable of identifying the first EVSE from the first EVSE or a place where the first EVSE is installed. The first EV may recognize the first EVSEID of the first EVSE through camera image recognition or power line communication. The first EVSEID may be unique for each site.

Then, the first EV may transmit an SDP request message including the first EVID and the first EVSEID to the SDP server SDPS through SDP communication (SDP comm.). The first EV may receive an SDP response message including an IP address of the first SECC SECC1 from the SDP server.

Here, the SDP server may provide the first EVID and the first EVSEID or information thereon to the first SECC. In addition, the SDP server may provide the IP address of the first EV to the first SECC.

Then, the first EV transmits a session setup request message including the first EVID to the first SECC. The first SECC knows the first EVSE based on the first EVSEID, and may respond to the session setup request message of the first EV and control the first EVSE.

According to the present exemplary embodiment, it is not necessary to repeatedly process the session setup request message by performing early pairing using communication between the SDP server and the EV. Although there may be a contention condition according to a time difference required for information related to proactive pairing to be provided from the SDP server to the SECC through internal communication, in case of initial failure of the SDP request message in the EV, the problem in the contention condition may be easily solved by repeatedly transmitting the SDP request message within a certain number of times at a certain time interval.

Figure 12:
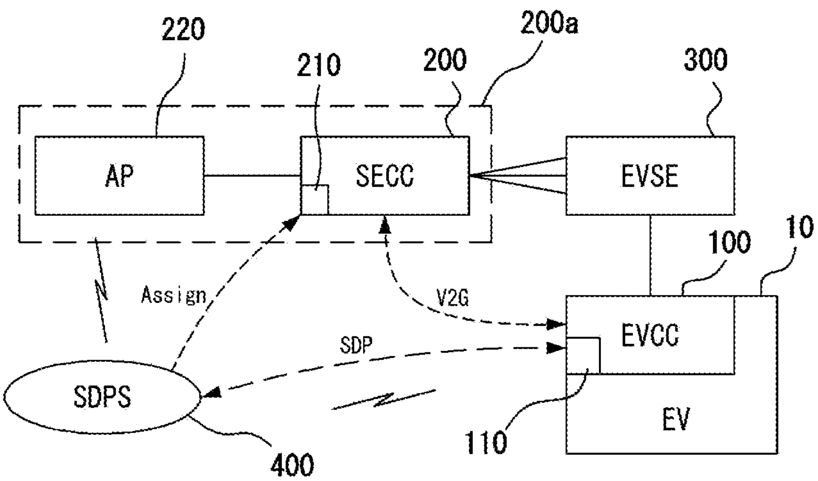
FIG. 12 is a schematic diagram of an architecture of a proactive pairing apparatus for wireless LAN-based smart charging or charging/discharging (hereinafter simply referred to as 'proactive pairing apparatus') according to another exemplary embodiment of the present disclosure.

FIG. 12 is a schematic diagram of an architecture of a proactive pairing apparatus for wireless LAN-based smart charging or charging/discharging (hereinafter simply referred to as 'proactive pairing apparatus') according to another exemplary embodiment of the present disclosure.

As shown in FIG. 12, a proactive pairing apparatus may include at least one EVSE 300, an SECC 200 that controls the at least one EVSE 300, an SDP client 210 mounted in the SECC 200, and an access point (AP) 220 connected to the SECC 200. Here, the SECC 200, the SDP client 210, and the AP 220 may be included in a single SECC **200*a* in a broad sense. The single SECC 200*a* may be referred to as a ground assembly. In addition, the EV 10 may be connected to a specific EVSE 300 by a plug or parked in a parking area where wireless charging of the specific EVSE 300** is possible.

The EVCC 100 mounted in the EV 10 may perform V2G communication with the SECC 200. An EV-side SDP client 110 using the same IP address as the EVCC 100 may be installed in the EVCC 100. Through the SDP client 110, the EV 10 may perform SDP-based communication with an SDP server SDPS 400.

The SECC 200 may include an SDP client 210 using the same IP address as the SECC 200, but is not limited thereto. The SECC 200 may be configured to be connected to the SDP server 400 through a separate internal communication defined by a manufacturer without mounting the SDP client 210.

The one or more APs 220 may form an extended service set (ESS) having one service set identifier (SSID) in a local area network (LAN) or wireless LAN, and may be connected to the single SDP server 400. The ESS may form one local link.

In addition, the SECC 200 may dynamically assign port numbers to a plurality of EVSEs or the specific EVSE 300. The port numbers may include a port number of a V2GTP entity providing a V2G transport protocol destination port number within a dynamic port range, a port number of the SECC, a port number of an EVSE managed by the SECC, or at least one port number selected from among them.

The SDP server 400 may receive an SDP request message of the EV through SDP communication with the EV 10, and assign the EV to a specific SECC 200 based thereon.

In addition, the SDP server 400 is usually configured separately in the outside, but is not limited thereto, and may be integrated into a specific SECC instead of a specific SDP client. In this case, the SDP server may be configured to have the same IP address as the specific SECC, and may support SDP communication with each EVCC of a plurality of EVs centering on the SECC 200.

The proactive pairing apparatus configured as described above may perform at least one proactive pairing method among the various exemplary embodiments described above.

For example, the first EVSE, as a proactive pairing apparatus, may detect or obtain an EVID of a first EV that is parked in or plugged into the first EVSE, and transmit the obtained EVID to the first SECC, thereby performing at least part of the proactive pairing method. In this case, the proactive pairing method may further include: obtaining, by the SDP server, the EVID through communication with the first SECC; and transmitting an SDP response message including the IP address of the first SECC to the first EV when the SDP request message including the EVID is received from the first EV.

In addition, for example, the first EV, as a proactive active pairing apparatus, may transmit an SDP request message including the first EVID capable of identifying the first EV to the SDP server, and perform at least part of the proactive pairing method by receiving an SDP response message from the SDP server communicating with the first SECC. In this case, the proactive pairing method may further include: obtaining, by the first EVSE, the first EVID from the first EV parked in or plugged into the first EVSE; and providing the obtained first EVID to the first SECC.

In addition, for example, the first SECC, as a proactive pairing apparatus, may obtain, from the first EVSE, the first EVID capable of identify the first EV with respect to the first EV parked in a parking area for wireless power transfer of the first EVSE or connected to the first EVSE through a conductive cable, and communicate with the SDP server based on the first EVID to perform at least part of the proactive pairing method. Here, the SDP server may be in a state of having received the SDP request message including the first EVID from the first EV. In addition, the first SECC may share information indicating that the SECC corresponding to the first EVID is itself with the SDP server. In this case, the proactive pairing method may further include: transmitting, by the SDP server, an SDP response message including the above information or information related to the first SECC to the first EV.

Figure 13:
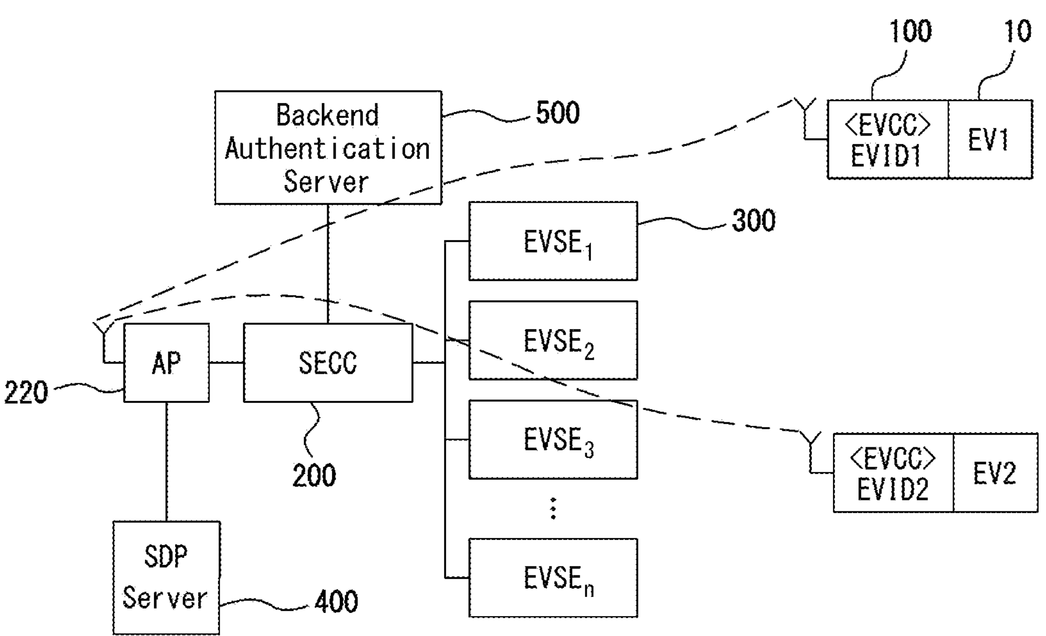
FIG. 13 is a block diagram illustrating an example of the architecture of the proactive pairing apparatus of FIG. 12.

FIG. 13 is a block diagram illustrating an example of the architecture of the proactive pairing apparatus of FIG. 12.

As shown in FIG. 13, the EVCC 100 mounted in the EV 10 including the first EV EV1 and the second EV EV2 may use the SDP to obtain the IP address and port number of the specific SECC 200. The SECC 200 may be connected to a plurality of EVSEs (EVSE1 to EVSEn) 300 and control each EVSE.

The EV 10 equipped with the EVCC 100 may transmit a SECC discovery request message through a local link where the SDP server 400 expects to respond with a SECC discovery response message including information on the IP address and port number of the SECC 200. The SECC discovery request message may correspond to or be included in the SDP request message.

The SECC discovery request message may be transmitted through the local link in a multicast manner. The local link may include a single ESS formed by the AP 220 connected to the SECC 200.

After receiving the IP address and port number of the SECC 200, the EVCC 100 may establish a transport layer connection to the SECC 200. Of course, the proactive pairing method or TCP/TLS connection establishment may be performed before the transport layer connection.

During TLS connection establishment, the EV 10 may verify whether it is communicating with a legitimate SECC not an illegal SECC based on an EVSE certificate. The EVSE certificate may not be limited to a certificate issued by a charging station operator (CSO) or a charge point operator (CPO), and may be issued by a backend authentication server 500 connected to the SECC 200.

The aforementioned proactive pairing apparatus may be configured to perform at least one of the proactive pairing methods described above with reference to FIGS. 5 to 11. A main configuration applicable to the EVCC 100 or SECC 200 belonging to the proactive pairing apparatus will be described later with reference to FIG. 18.

FIGS. 14 to 17 are diagrams for describing EV smart charging and charging/discharging infrastructures applicable to the proactive pairing apparatus of FIG. 12.

Figure 14:
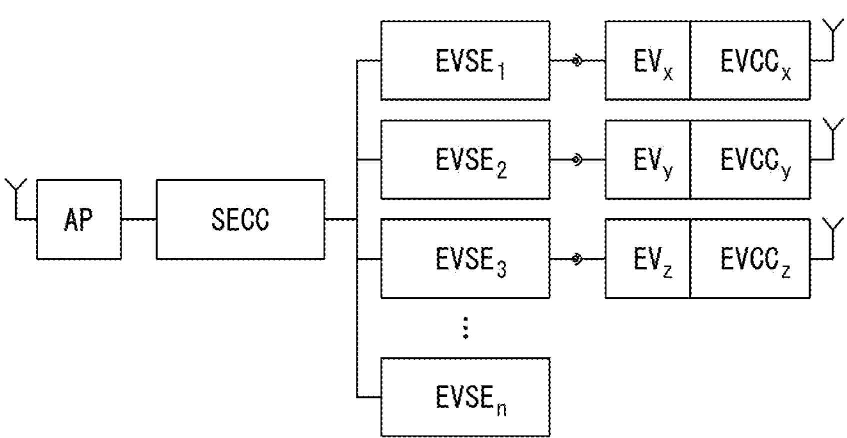
FIGS. 14 to 17 are diagrams for describing EV smart charging and charging/discharging infrastructures applicable to the proactive pairing apparatus of FIG. 12.

As shown in FIG. 14, a single AP may be connected to a single SECC, the single SECC may be connected to a plurality of EVSEs (EVSE1 to EVSEn), and some of the plurality of EVSEs may be connected with each of a plurality of EVs (e.g., EVx, EVy, and EVz) via conductive cables or electromagnetic coupling for wireless power transfer. Each of the plurality of EVs may be equipped with a plurality of corresponding EVCCs (e.g., EVCCx, EVCCy, EVCCz), respectively. The single SECC may communicate with each of the plurality of EVCCs through a wireless LAN.

Figure 15:
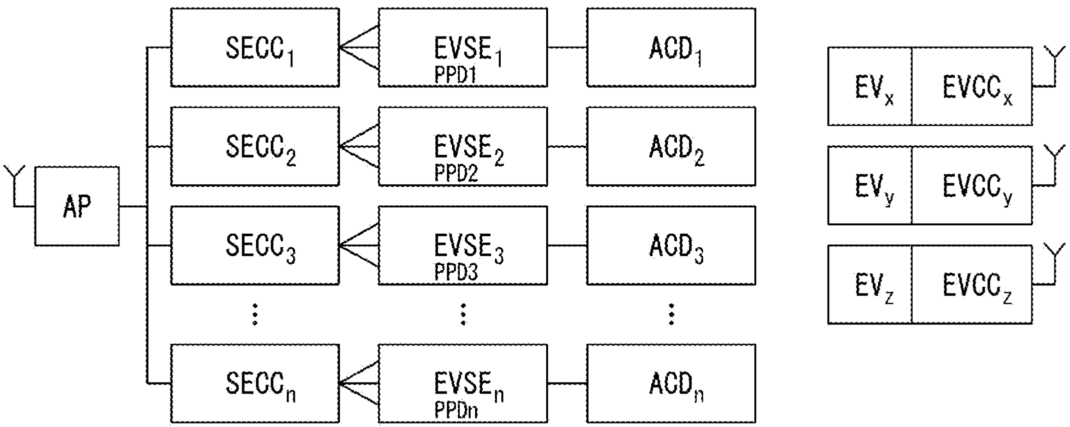

As shown in FIG. 15, a single AP may be connected to a plurality of SECCs (e.g., SECC1 to SECCn), the first SECC SECC1 among the plurality of SECCs may be connected to at least one first EVSE EVSE1 each of which has a first pairing and positioning device PPD1, and the at least one first EVSE EVSE1 may be connected to a first automated connection device ACD1. Similarly, an n-th SECC SECCn may be connected to at least one n-th EVSE EVSEn each of which has an n-th pairing and positioning device PPNn, and the at least one n-th EVSE may be connected to an n-th automated connection device ACDn. Here, n is any natural number greater than or equal to 2.

Figure 16:
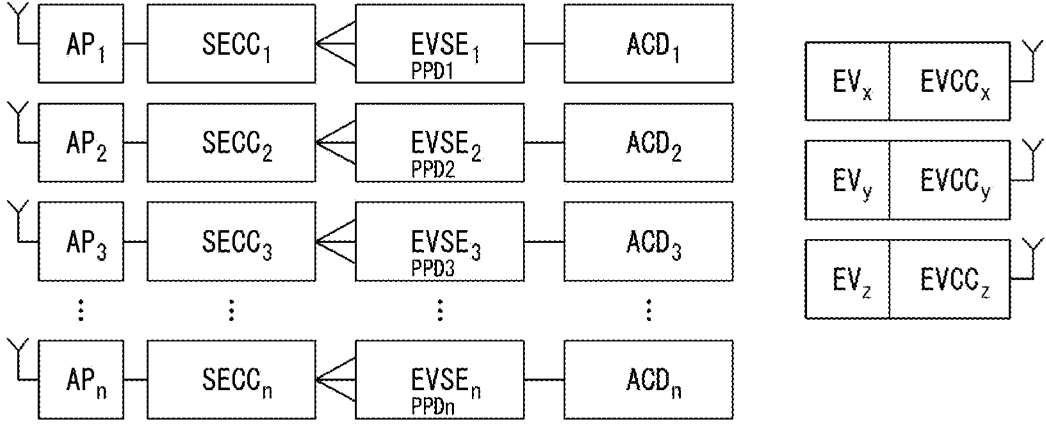

As shown in FIG. 16, a first AP AP1 may be connected to the first SECC SECC1, the first SECC may be connected to at least one first EVSE EVSE1 each of which has a first pairing and positioning device PPD1, and the at least one first EVSE may be connected to the first automatic connection device ACD1. Similarly, a second AP AP2 may be connected to the second SECC SECC2, the second SECC may be connected to at least one second EVSE EVSE) each of which has a second pairing and positioning device PPD2, and the at least one second EVSE may be connected to the second auto-connect device ACD2. That is, an n-th AP APn may be connected to an n-th SECC SECCn, the n-th SECC may be connected to at least one n-th EVSE EVSEn each of which has an n-th pairing and positioning device PPDn, and the at least one n-th EVSE may be connected to the n-th automatic connection device ACDn. Here, n is any natural number greater than or equal to 3.

Figure 17:
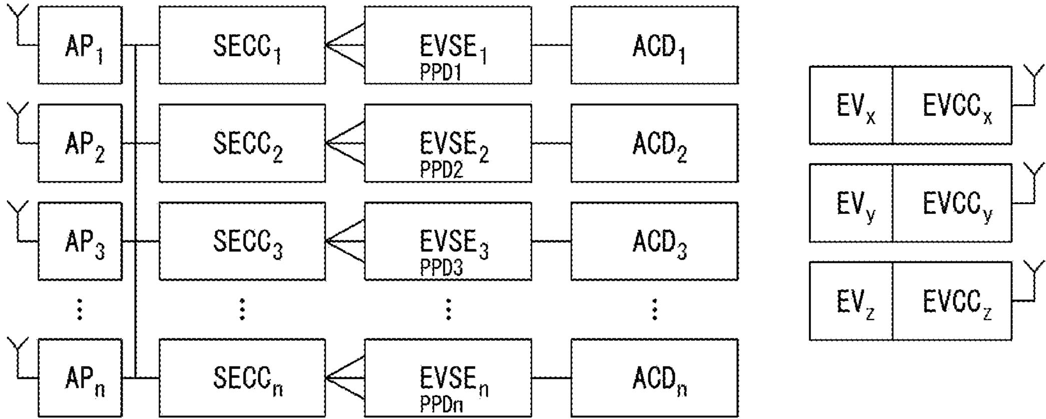

As shown in FIG. 17, each of the plurality of APs (AP1 to APn) may be connected to each of the plurality of SECCs (SECC1 to SECCn) in a multiple connection form, the first SECC SECC1 among the plurality of SECCs may be connected to at least one first EVSE EVSE1 each of which has the first pairing and positioning device PPD1, and the at least one first EVSE may be connected to the first automated connection device ACD1. Similarly, the n-th SECC SECCn may be connected to at least one n-th EVSE EVSEn each of which has the n-th pairing and positioning device PPNn, and the at least one n-th EVSE may be connected to the n-th automated connection device ACDn. Here, n is any natural number greater than or equal to 2.

In the present exemplary embodiment, one SDP server may be connected to an ESS formed by each AP.

Figure 18:
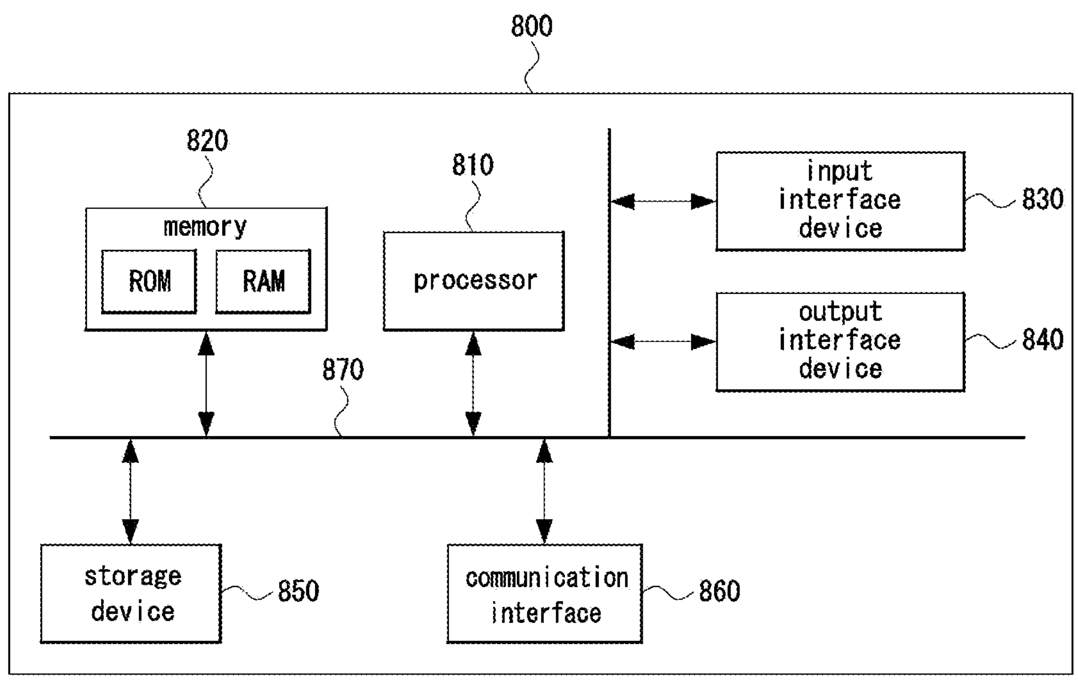
FIG. 18 is a block diagram of a configuration applicable to a proactive pairing apparatus according to another exemplary embodiment of the present disclosure.

FIG. 18 is a block diagram of a configuration applicable to a proactive pairing apparatus according to another exemplary embodiment of the present disclosure.

As shown in FIG. 18, an active pairing apparatus 800 may include at least one processor 810 and a memory 820, and include a program or program instructions implementing the proactive pairing method of any one of the above-described exemplary embodiments. The program or program instructions may be stored in the memory 820 and loaded into the processor 810 according to operations of the processor 810.

In addition, the proactive pairing apparatus 800 may further include an input interface 830, an output interface 840, a storage device 850, and a communication interface 860. The processor 810, memory 820, input interface 830, output interface 840, storage device 850, and communication interface 860 may be connected to each other through an internal bus 870, intranet, or Internet.

The processor 810 may execute the program instructions stored in the memory 820 or the storage device 850. The processor 810 may be implemented by at least one central processing unit (CPU), graphics processing unit (GPU), or vehicle control unit, and may be implemented by any other processor(s) that can perform the methods according to the present disclosure.

The memory 820 may include, for example, a volatile memory such as read only memory (ROM) and a non-volatile memory such as random access memory (RAM). The memory 820 may load the program instructions stored in the storage device 850 and provide the loaded program instructions to the processor 810.

The input interface 830 and the output interface 840 may include a keyboard, mouse, display device, touch screen, voice input device, and/or the like.

The storage device 850 is a recording medium suitable for storing the program instructions and data, such as a magnetic medium such as a hard disk, floppy disk, and magnetic tape, an optical medium such as a compact disk read only memory (CD-ROM), digital versatile disk (DVD), a magneto-optical medium such as a floptical disk, or a semiconductor memory such as a flash memory, erasable programmable ROM (EPROM), or solid state drive (SSD) made based thereon.

The program instructions stored in the storage device 850 may include program instructions for proactive pairing according to the present exemplary embodiments. For example, the program instructions may include instructions for the EV to transmit the SDP request message including the EVID to the SDP server, instructions for the SECC to obtain the EVID from the EVSE, instructions for the EVSE to obtain the EVID capable of identifying the EV from the EV being parked in or plugged into the EVSE, and instructions for the EV to receive an SDP response message corresponding to the SDP request message from the SDP server, and the like.

The communication interface 860 may include a communication subsystem supporting communication scheme(s) of at least some among entities including a power grid operator (V2G Operator), a charging service operator (or, mobility operator (MO)), a charging service provider (CSP), a mobility service provider (i.e., e-mobility service provider (EMP)), a charging station operator (CSO), a charge point operator (CPO), an electric vehicle (EV), an EV communication controller (EVCC), a supply equipment communication controller (SECC), and an SDP server.

For example, a communication system supported by the communication interface 860 may include a wireless local area network (WLAN) system. The WLAN system may include an access point (AP), a station, an AP multi-link device (MLD), or a non-AP MLD. The station may mean an STA or a non-AP STA. An operating channel width supported by the access point or station may be 20 MHz, 80 MHz, 160 MHz, or the like.

In addition, the communication interface 860 may be implemented to support a 4G communication system (e.g., long-term evolution (LTE) communication system or LTE-Advanced (LTE-A) communication system), a 5G communication system (e.g., new radio (NR) communication system), and/or the like. Here, the 4G communication system may be configured to support communication in a frequency band of 6 GHz or below, and the communication system may be configured to support communication in a frequency band of 6 GHz or above as well as a frequency band of 6 GHz or below.

The aforementioned communication system may be used in the same sense as a communication network, and 'LTE' may refer to '4G communication system', 'LTE communication system' or 'LTE-A communication system', and 'NR' may refer to '5G communication system' or 'NR communication system'. A communication system to which exemplary embodiments according to the present disclosure are applied is not limited to the above description, and exemplary embodiments according to the present disclosure may be applied to various communication systems.

According to the above-described configuration, the proactive pairing apparatus 800 may transmit an SDP request message including an EVID capable of identifying an EV to the SDP server, and receive an SDP response message including information indicating a specific SECC controlling an EVSE which the EV is parked in or plugged into from an SDP server communicating with an SECC, thereby configuring pairing with the SECC early.

Meanwhile, the proactive pairing methods described in the above-described exemplary embodiments may be implemented as computer-readable programs or codes on a computer-readable recording medium. The computer-readable recording medium may include all types of storage devices in which data that can be read by a computer system is stored. In addition, the computer-readable recording medium may be distributed to computer systems connected through a network to store and execute the computer-readable programs or codes in a distributed manner.

The computer-readable recording medium may include hardware devices specially configured to store and execute program instructions, such as ROM, RAM, and flash memory. The program instructions may include high-level language codes that can be executed by a computer using an interpreter or the like as well as machine codes generated by a compiler.

Some aspects of the present disclosure have been described above in the context of a device but may be described using a method corresponding thereto. Here, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, at least one of most important operations of the method may be performed by such a device.

In exemplary embodiments, a programmable logic device (e.g., a field-programmable gate array) may be used to perform some or all of functions of the methods described herein. In embodiments, the field-programmable gate array may be operated with a microprocessor to perform one of the methods described herein. In general, the methods are preferably performed by a certain hardware device.

While the present disclosure has been described above with respect to embodiments thereof, it would be understood by those of ordinary skill in the art that various changes and modifications may be made without departing from the technical conception and scope of the present disclosure defined in the following claims.

What is claimed is:

1. A proactive pairing method for wireless local area network (LAN)-based smart charging or charging/discharging, performed by an electric vehicle (EV), the proactive pairing method comprising:

transmitting a supply equipment communication controller (SECC) discovery protocol (SDP) request message to an SDP server, the SDP request message including a first EV identifier (EVID) capable of identifying a first EV, wherein a first electric vehicle supply equipment (EVSE) obtains the first EVID capable of identifying the first EV from the first EV parked in or plugged into the first EVSE, and provides the obtained first EVID to a first SECC; and receiving an SDP response message corresponding to the SDP request message from the SDP server communicating with the first SECC, wherein the SDP response message includes information indicating that an SECC corresponding to the first EVID is the first SECC.

2. The proactive pairing method according to claim 1, further comprising: after receiving the SDP response message, transmitting a session setup request message including the first EVID to the first SECC.

3. The proactive pairing method according to claim 1, further comprising: repeatedly transmitting the SDP request message in a multicast scheme at preset time intervals within a predetermined number of times, until the SDP response message including the information indicating that the SECC corresponding to the first EVID is the first SECC is received.

4. The proactive pairing method according to claim 1, wherein the SDP response message is received when the information indicating that the SECC corresponding to the first EVID is the first SECC is shared through communication between the first SECC and the SDP server.

5. The proactive pairing method according to claim 1, further comprising: transmitting a transport layer security (TLS) request message to the first SECC in an SDP handshake and receiving a TLS response message from the first SECC.

6. A proactive pairing method for wireless local area network (LAN)-based smart charging or charging/discharging, performed by an electric vehicle (EV), the proactive pairing method comprising:

obtaining a first electric vehicle supply equipment (EVSE) identifier (EVSEID) capable of identifying a first EVSE from the first EVSE, wherein the first EVSE is an EVSE in which a first EV is parked or with which the first EV is connected through a conductive cable;

transmitting, by an EV communication controller (EVCC) of the first EV, a supply equipment communication controller (SECC) discovery protocol (SDP) request message including the first EVSEID in a multicast scheme through a local link to which a plurality of SECCs are connected, in order to discover an SECC controlling the first EVSE; and receiving, from an SDP server communicating with a first SECC, an SDP response message including the SDP request message or information related to the first SECC, the information related to the first SECC indicating that a specific SECC corresponding to the EVSE ID is the first SECC itself.

7. The proactive pairing method according to claim 6, wherein the first EVID of the first EV is stored by the first SECC and delivered from the first SECC to the first EVSE.

8. The proactive pairing method according to claim 6, wherein the SDP request message further includes a first EV identifier (EVID) of the first EV, and the first EVID is a static identifier or a dynamic identifier that changes for each use.

9. The proactive pairing method according to claim 8, wherein a structure of the SDP request message includes parameters for security, transport protocol, EVID and EVSEID.

10. A proactive pairing apparatus for wireless local area network (LAN)-based smart charging or charging/discharging, comprising:

a first electric vehicle supply equipment (EVSE) connected to a power grid and configured to supply power to a first electric vehicle (EV);

a first supply equipment communication controller (SECC) controlling operations of the first EVSE and communicating with an EV communication controller (EVCC) of the first EV; and a SECC discovery protocol (SDP) server communicating with the first EV using an SDP, wherein the first EVSE obtains an EV identifier (EVID) capable of identifying the first EV from the first EV parked in or plugged into the first EVSE, and provides the obtained EVID to the first SECC; and the first EV transmits an SDP request message including the EVID to the SDP server, and receives, from the SDP server communicating with the first SECC, an SDP response message including the SDP request message or information indicating that an SECC corresponding to the EVID is the first SECC.

11. The proactive pairing apparatus according to claim 10, wherein the first EV transmits an SDP request message including an EVSE identifier (EVSEID) capable of identifying the first EVSE in a multicast scheme through a local link to discover the first SECC, and receives, from the SDP server communicating with the first SECC in the local link, an SDP response message including information on the first SECC matching the EVSEID.

12. The proactive pairing apparatus according to claim 11, wherein the first EV obtains the EVSEID from the first EVSE or a place where the first EVSE is installed.

13. The proactive pairing apparatus according to claim 12, wherein the first EV detects a quick response (QR) code including an Internet protocol (IP) address and a port number of the first SECC.

* * * * *